Oct. 30, 1951 W. J. POCH 2,573,354
VARIABLE FREQUENCY MULTIVIBRATOR
Filed July 26, 1945
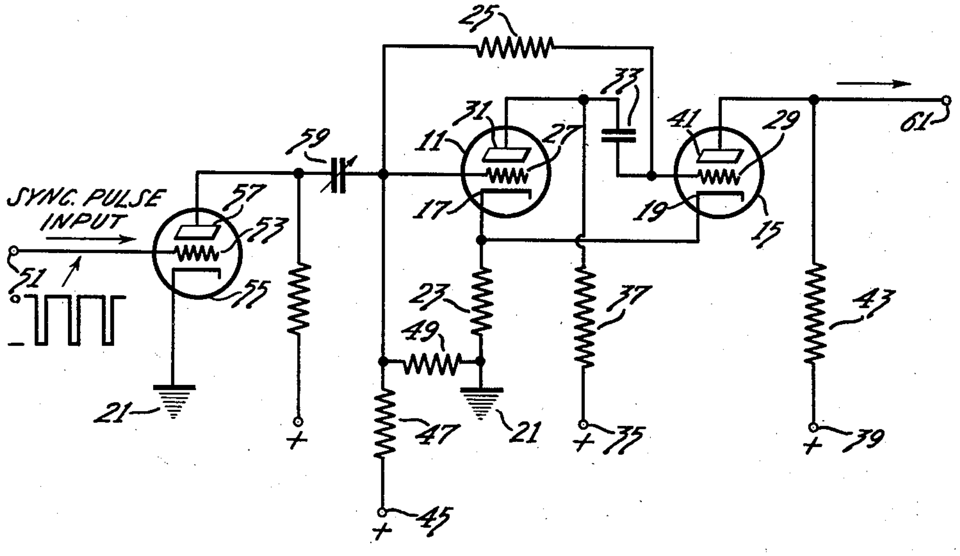
INVENTOR.
Waldemar J. Poch
BY
H. S. Grover,
ATTORNEY Patented Oct. 30, 1951

2,573,354

UNITED STATES PATENT OFFICE 2,573,354

VARIABLE FREQUENCY MULTIVIBRATOR

Waldemar J. Poch, Moorestown, N. J., assignor to Radio Corporation of America, a corporation of Delaware Application July 26, 1945, Serial No. 607,111

5 Claims. (Cl. 250—36)

This invention relates to television circuits and, particularly, to the sync signal generator portion thereof.

In connection with the development of sync signals for use with television or oscillographic devices, it has frequently been proposed to provide a multivibrator type of unit which is suitable for developing synthesizing or triggering impulses which will serve to control the operation of driving and driven units and to maintain synchronism therebetween. Especially in connection with the development of the vertical or slow deflection control pulses, it has been found in the past that wherever a change in frequency of the multivibrator was desired to vary the frequency at which the vertical control or sync pulses were developed, it was necessary to provide a relatively large potentiometer or a very large variable capacitor to change the oscillator speed. These units became expensive and, at the same time, the range of control was relatively narrow.

By the present invention, provisions have been made for developing low speed or vertical sync or deflection control pulses through the use of a multivibrator type of circuit combined with a small size variable capacitor arranged to so connect the multivibrator unit with the horizontal or line deflecting circuit control that it receives the output horizontal or line sync pulse thereon as a control pulse. At the same time, the invention provides a highly efficient speed control for the vertical multivibrator in such a way that the speed control becomes effective over a relatively large frequency range. Essentially, the circuit is of such character that bias is developed upon the grid of an oscillator as a result of the introduction of high frequency pulses into the circuit and changes in bias produce changes in output frequency. Thus, use of a circuit device that results in a change in amplitude of the incoming high frequency pulses will cause a change in the oscillator frequency.

Accordingly, with this type of circuit, it becomes a primary object of the invention to provide a speed control system for varying or controlling the rate at which vertical or frame deflection or control sync pulses are developed and, at the same time, to avoid the complexities of prior art arrangements by insuring increased stability of operation, simplicity and cheapness of installation and a great range of flexibility of operation.

Other objects will, of course, become apparent and at once suggest themselves when the following specification is read in conjunction with the accompanying drawings, in which the single figure thereof shows one preferred embodiment of the invention.

Referring now to the drawings, the tubes 11 and 15 are connected in such a way as to operate as a cathode coupled multivibrator unit. To provide this type of connection, the cathode elements 17 and 19 connect together and to ground 21 through the cathode resistor 23. A resistor element 25, which is of relatively high value, such as 1.8 megohms, for instance, connects between the two grid or control electrode elements 27 and 29 of these tubes. The plate or anode element 31 of the first tube 11 connects to the grid or control electrode 29 of the second tube 15 by way of the coupling condenser 33. The plate supply for the plate or anode 31 is from a source (not shown) which has its positive terminal connected at the terminal point 35 and its negative terminal preferably grounded so that the plate voltage is fed through the plate resistor 37.

The plate voltage for the tube 15 is provided from a similar source of voltage (not shown) connected at the terminal point 39 and feeding to the plate or anode 41 of the tube 15 through the plate resistor 43. A further source of positive voltage is connected at the terminal point 45 and through resistors 47 and 49 of which one terminal of the latter connects to the upper terminal of the resistor 47 and to the grid 27 of the first tube 11 and the other terminal of which connects to ground 21.

In order that the frequency at which pulses are developed from the multivibrator unit may be varied under the control of line sync impulses as developed in television apparatus and as used to synthesize the raster traces of a pattern on the target of a cathode ray tube, these horizontal or line sync impulses are supplied in negative polarity at an input terminal 51 to be supplied to the grid or control electrode 53 of a horizontal pulse amplifier tube 55. This tube is connected so that its output is fed from the plate electrode 57 through a variable coupling condenser 59 into the grid circuit of the first tube 11 of the multivibrator unit by way of connection of the said variable capacitor to the grid.

With the connection shown, the sync pulses, as applied to the input terminal 51 and which are schematically shown adjacent thereto, are inverted in the amplifier and serve when applied to the multivibrator unit to change the bias on the first tube 11 thereof due to the change in grid current which would be caused by the pulses. An explanation of the effect of changing the value of the input coupling condenser 59 on the frequency of the oscillator may perhaps best be understood if, for example, it is assumed that the value of capacitance of condenser 59 is increased. An increase in capacity of condenser 59 will provide a pulse on control electrode 27 having a higher amplitude. It follows that the rectification action of control electrode 27 will produce, as a result of a higher amplitude pulse, a relatively more negative bias potential at control electrode 27. This relatively more negative bias potential is transferred to control electrode 29 through resistance element 25 to increase the time it takes the condenser 33 to discharge to a point where tube 15 will become conducting for the start of another cycle. It will thus be seen that with an increase in capacity of condenser 59, a longer time is necessary to complete the necessary change in the charge of condenser 33. This effectively changes the long time interval portion of the cycle.

On the other hand, as the capacity 59 is reduced in value, there is less grid current flowing in tube 11 or less negative influence on the potential of the control electrodes 27 and 29 so that the time interval required for the condenser 33 to change its charge is less and hence the frequency of oscillations is greater.

It will be appreciated from the connection shown that in this instance, it is desirable to introduce a so-called cross-talk effect from the line sync pulses into the assumed frame sync pulses developed by the multivibrator tubes 11 and 15.

With these line sync pulses applied to the first tube 11 and serving to vary the grid current flowing therein, it will be appreciated that a small change in the size of the capacitor 59 will materially change the output frequency from the multivibrator unit as a whole, which frequency is made available at the output terminal 61, for instance. The introduced cross-talk effect injected as a result of the line sync impulses applied at the terminal 51 being fed through the capacitor 59 tends to lock in the multivibrator unit at a sub-harmonic of the line frequency which is highly desirable in that the line traces during the vertical return time thus tend to remain stationary. Consequently, any movement in the vertical direction which would otherwise be introduced in the raster traced as a result of the control effect or suitable deflection apparatus (not shown) controlled by the output pulse at terminal 61 will be reduced and minimized.

It is not essential for the operation that the low frequency oscillator actually lock-in at the frequency of the applied controlling pulses. This condition ordinarily prevails and is advantageous but the actual lock-in might, under some circumstances, not actually be had even though adequate frequency control is maintained.

With the variance of the small condenser 59, which may be of a size varying between 4 and 24 mmf., for instance, a wide range of frequency variance from the oscillator is possible. Likewise, it will be appreciated that the oscillator produces a pulse output with the pulses occurring at the desired vertical frequency. A variance of the small capacitor 59 thus makes unnecessary the changing of a relatively large capacitor, such as 33, which preferably may be of a size of about 6,000 mmf., where a very considerable change in size would be required to produce any appreciable change in frequency.

Purely by way of example and in no limiting sense, suitable values for the resistors used in connection with this apparatus have been shown by the schedule to follow:

| Resistors | Value |
|---|---|
| 23 | 2,700 ohms. |
| 25 | 1.8 megohms. |
| 37 | 100,000 ohms. |
| 43 | 10,000 ohms. |
| 47 | 100,000 ohms. |
| 49 | 4,700 ohms. |

The foregoing schedule of resistance values thus should be considered in a broad sense as exemplifying one suitable range of constants, although variances within reasonable limits obviously may be made. Various types of tubes for use as the elements 11 and 15 are suitable, with one suitable type being, for instance, that known as the 6J6.

Having now described my invention, what is claimed is:

1. A speed control circuit for a substantially stable frequency cathode follower type multivibrator unit having a pair of cross-connected vacuum tubes with the output of one tube connected to the input of the other by a condenser for developing output pulses of selected frequency which comprises means including a capacity element of a size small with respect to said condenser for applying control pulses to the input circuit of one of the tubes of the multivibrator for stabilizing the output frequency at a submultiple of said control pulses and under the control of the applied pulses, a resistance element direct current connecting both of said control electrodes, said resistance element connected to a point of fixed potential only through a second resistance element, and means to vary the value of the capacity element thereby to provide a change in bias in the multivibrator unit to change the frequency thereof within relatively wide limits by a relatively narrow range of variance of the said capacity element.

2. A deflection control circuit for television apparatus and the like which comprises a pair of cathode coupled tubes having direct current coupled control electrodes serving as an approximately stable multivibrator operating to develop relatively low frequency output pulses, an input circuit for said multivibrator unit comprising the combination of an input tube and a variable capacity element for coupling the output of said input tube to the control electrode of one of the tubes of the multivibrator unit, said input tube being adapted to have supplied to its input circuit pulse energy of a frequency which is a multiple of the normal output frequency of the multivibrator unit, said capacitive element being arranged to supply the output pulse control energy of said input tube to the multivibrator unit, and means to vary the normal output frequency of the multivibrator unit within relatively wide limits by varying the size of the said coupling condenser within a relatively narrow range so as to control thereby the grid current flowing in the first of the said multivibrator tubes and to establish the speed control thereof by virtue of the higher frequency input control pulses producing a controlling effect thereon.

3. In a speed control circuit for modifying the normal oscillation frequency of a substantially stable cathode follower type multivibrator unit having a pair of cross-connected vacuum tubes of which the anode of the first tube is connected to the control electrode of the second tube by a capacity element and of which the tube cathodes are directly connected together, said first tube also having a control electrode, a resistance element direct current connecting both of said control electrodes, said resistance element connected to a point of fixed potential only through a second resistance element, an input capacity element connected to supply control pulses occurring at a frequency substantially higher than the natural frequency of the multivibrator unit to the control electrode of the first of the multivibrator unit tubes in a polarity tending to cause grid current to flow in said tube to charge the capacity element and thereby modify the bias upon the said tube, said input capacity being of a size which is small compared with the capacity coupling the anode of the first tube to the control electrode of the second tube, and means to modify the normal output frequency of the multivibrator unit within wide frequency limits to a small variation of the capacity size of the input condenser to modify thereby the grid current flowing in the first of the multivibrator tubes.

4. In a speed control circuit for modifying the normal oscillation frequency of a substantially stable cathode follower type multivibrator unit having a pair of vacuum tubes of which the anode of the first tube is connected to the control electrode of the second tube by a capacity element and of which the tube cathodes are directly connected together and wherein said tube control electrodes are connected through a resistance element to provide electrical coupling, said resistance element connected to a point of fixed potential only through a resistor an input capacity element connected to supply control pulses occurring at a frequency substantially higher than the natural frequency of the multivibrator unit to the control electrode of the first of the multivibrator unit tubes in a polarity tending to cause grid current to flow in said tube to charge the capacity element and thereby modify the bias upon the said tube, said input capacity being of a size which is small compared with the capacity coupling the anode of the first tube to the control electrode of the second tube, said input capacity also being variable to modify the normal output frequency of the multivibrator unit within wide frequency limits to a small variation of the capacity size of the input condenser to modify thereby the grid current flowing in the first of the multivibrator tubes.

5. A multivibrator comprising in combination, a first and second tube each having a control electrode, a cathode, and an anode, said cathodes connected together and to a point of fixed potential through a resistance element, the anode of the first tube connected to the control electrode of the second tube through a capacitive element, a source of positive going pulses coupled to the control electrode of said first tube through a variable capacity element, a resistor direct current connecting said control electrodes together, a source of fixed potential and a second resistance element, said second resistance element connected between said source of fixed potential and the control electrode of said first tube.

WALDEMAR J. POCH.

REFERENCES CITED

The following references are of record in the file of this patent:

UNITED STATES PATENTS

| Number | Name | Date |
|---|---|---|
| 2,365,583 | Nagel et al. | Dec. 19, 1944 |
| 2,377,894 | McCool | June 12, 1945 |
| 2,405,237 | Ruhlig | Aug. 6, 1946 |
| 2,411,062 | Schade | Nov. 12, 1946 |
| 2,416,201 | Nagel et al. | Feb. 18, 1947 |
| 2,416,328 | Labin | Feb. 25, 1947 |
| 2,428,058 | Wise | Sept. 30, 1947 |
| 2,455,373 | Lester | Dec. 7, 1948 |